United States Patent [19]

Jackson

[11] Patent Number: 4,539,104
[45] Date of Patent: Sep. 3, 1985

[54] BUCKET ELEVATOR LINKAGE FOR COARSE COAL WASHER

[76] Inventor: Royce Jackson, P.O. Box 127, Dubois, Ill. 62831

[21] Appl. No.: 638,410

[22] Filed: Aug. 7, 1984

[51] Int. Cl.³ .................................................. B03B 5/30
[52] U.S. Cl. .............................. 209/172.5; 209/492; 198/712
[58] Field of Search ............... 198/712; 209/172, 173, 209/172.5, 307, 457, 492; 210/325, 330, 401

[56] References Cited

U.S. PATENT DOCUMENTS

| | | | |
|---|---|---|---|
| 1,838,362 | 12/1931 | Clark et al. | 198/712 X |
| 2,609,098 | 9/1952 | Lotz | 209/457 |
| 2,638,205 | 5/1953 | Hapman | 198/712 |
| 2,666,525 | 1/1954 | Pate | 209/457 |
| 3,462,003 | 8/1969 | Mencacci et al. | 198/712 |

FOREIGN PATENT DOCUMENTS 2385619 12/1978 France ................. 198/712

*Primary Examiner*—Charles Hart
*Attorney, Agent, or Firm*—Pravel, Gambrell, Hewitt & Kimball

[57] ABSTRACT

A continuous bucket elevator used in a method of separating coal according to its size and for cleaning refuse material from the coal in a Baum-type jigging apparatus wherein each bucket is connected to the adjacent bucket by a link received by a roll pin held by a bushing at each end in each bucket and the flange of a plate which is centrally welded to the bucket and has portions biased outwardly therefrom which merge into further portions having openings for receiving the roll pins, the diameter of the aligned openings in the further part, in the bushings, and in intervening link and the diameter of the roll pins being such so as to restrict wear due to the abrasive nature of the material being handled so that all components of the elevator wear out at about the same time and need not be replaced until after two or three cycles of use, each cycle being normally for seven and ten months.

19 Claims, 11 Drawing Figures

BUCKET ELEVATOR LINKAGE FOR COARSE COAL WASHER

BACKGROUND OF THE INVENTION

This invention relates to a continuous bucket elevator which is used in a method of separating non-coal impurities from raw coal and, more particularly, to structure for linking the buckets together In the operation of a conventional coal washbox, coal is separated into various sizes and the segregation of refuse material is effected in a liquid medium by a pulsating movement of the liquid to produce back and forth surging motion within each cell of the washbox alternately to distend and then settle the material being treated while being supported on screens or perforated plates. Most non-coal impurities have specific gravities greater than coal. Such differences in specific gravity provide the basis for mechanical separation of coal from the non-coal refuse. As material progresses through the washbox, heavy refuse material and middlings are separated therefrom and delivered to continuous bucket elevators which remove the waste material from the washbox. In addition, the elevators are used in the removal of fine silica particles in the hutch material. Buckets currently used in such elevators have parallel vertically disposed side steel plates which are connected by U-shaped screening plates having a plurality of openings through which hutch water including the silica material tends to drain as the elevator removes the refuse material from the washbox. The elevator also includes two elevator chains which have the buckets secured thereto and chain links thereof are received by sprockets provided at the upper and lower ends of the elevator compartment. For securing the buckets to the elevator chains, each bucket is provided with four bushings, two on each side, one at the upper aspect and the other at the lower aspect of each side.

Depending on the extent of its use and the nature of the raw coal being processed, a washbox is expected to perform in cycles of seven to ten months with ordinary maintenance and adjustments being made during each cycle. At the end of each cycle, the washbox is taken out of operation and worn parts are replaced in a major renovation. Because of the abrasive characteristics of the material and, particularly the hutch material, components of the washbox are subjected to excessive wear and many must be replaced at the end of each cycle.

An elevator bucket, as such, should last for two to three cycles. Nevertheless, repairs are required between cycles and the major repairs involve the chain links and bushings. Rather than risk unscheduled repairs during an operation cycle, it is not uncommon to replace the entire chain assembly at the end of each cycle.

As the chain assembly is subjected to ordinary wear during an operating cycle, it is retained in proper tension by adjusting rods at the head of the bucket system. When the adjustment reaches its limits, a bucket may be removed from the system whereupon the adjusting rods are lowered and the chain is again tightened to the proper amount of tension.

Replacement of the chain at the end of each cycle and repair or replacement of the bushings involve a considerable investment in time and expense. Nevertheless, for many years this investment has been part and parcel of washbox repairs and component replacements considered necessary or advisable at the end of each operating cycle.

Two patents which disclose coal washboxes of a type in which the instant invention may be installed, are U.S. Pat. No. 2,609,098 of C. Lotz issued Sept. 2, 1952 and U.S. Pat. No. 2,666,525 of R. Pate which issued Jan. 19, 1954. The latter is assigned to McNally-Pittsburg Manufacturing Corporation of Pittsburg, Kans. McNally has manufactured washboxes for a number of years including the McNally Norton Standard washer, the McNally Giant washer, the McNally Mogul washer and the McNally-Norton Unit Washery, all of which have continuous bucket type elevators. Steel washbox chains are available from the Rexnord Mechanical Power Division, Engineering Chain Operation, of Milwaukee, Wis. and Westran Corporation Manganese Cast Chain Division of Muskegon, Mich. Elevator buckets are available from McNally Pittsburg Mfg. Corp. in various sizes from less than one foot width to widths in excess of four feet. Various types of bucket elevators are well known in the art. They include Caldwell elevators, Gifford-Wood Co. apron conveyors, Jeffrey V bucket conveyors, Peck carriers for coal and the like, Centrifugal discharge-type bucket elevators, Perfect discharge-type bucket elevators, continuous bucket elevators on single-strand chains or belts, super-capacity continuous bucket elevators on double strand chains as well as others. The state of the art is exemplified by the following U.S. Patent Nos. 119,580; 289,466; 645,175; 1,583,221; 1,671,571; 1,725,506; 2,335,166; 2,620,575; 2,631,459; and 4,000,568.

SUMMARY OF THE INVENTION

The inventor considers it economically and operationally advantageous for all components of the continuous bucket elevator wear out at approximately the same time without presenting earlier risks of failures, whereby a new system is installed at the end of every second or third cycle and the necessity of interim repairs is eliminated or at least substantially reduced. In this connection, one of the problems has been that the fork-type links have tended to last longer with less wear than the straight links and connecting pins. But it has been found that if the forked links, that is those having the bifurcated ends for receiving the straight links, are replaced only every other cycle, the wear to which they are subjected to during the second cycle, in addition to the deterioration that occurred during the first cycle, issufficient that the risk of breakage is too high to justify their continued use. Thus rather than risk such unscheduled downtimes or a major breakdown during operations, it has been the practice, as noted above, that the entire chain assembly, including its forked links, is changed at the end of each cycle. The possible solution of simply using heavier, wider chains with larger pins has the disadvantage of adding to the weight and width of the elevator assembly which, in turn, requires strengthening its supporting structure, and is not considered satisfactory particularly for installations in existing washboxes. It has occurred to the inventor that a better solution is to eliminate the forked links, as such, by combining their functions into the sides of the buckets and with this structure to enlarge the bushings and connecting pins so that wear occurs over a larger surface. This also eliminates motion of forked links relative to the bucket sides and provides more room for large straight links between neighboring buckets. By this means, wear areas of the continuous bucket may be enlarged and opportunity for play is reduced whereby less adjustment of the assembly is required during its operating cycle. Further, the weight of the continuous elevator assembly and its width are somewhat reduced or, in any event, not increased to the extent that would occur by the substitution of a heavier, wider chain. But, the primary advantage and object of the invention is to prolong the life of the bucket elevator assembly so that the assembly and most, if not all, of its components need not be replaced until their second or third cycle of operations, when the entire assembly is replaced.

Other objects, adaptabilities and capabilities of the invention will be understood by those skilled in the art as the description progresses, reference being had to the accompanying drawings in which:

DESCRIPTION OF THE PREFERRED EMBODIMENTS

Figure 1:
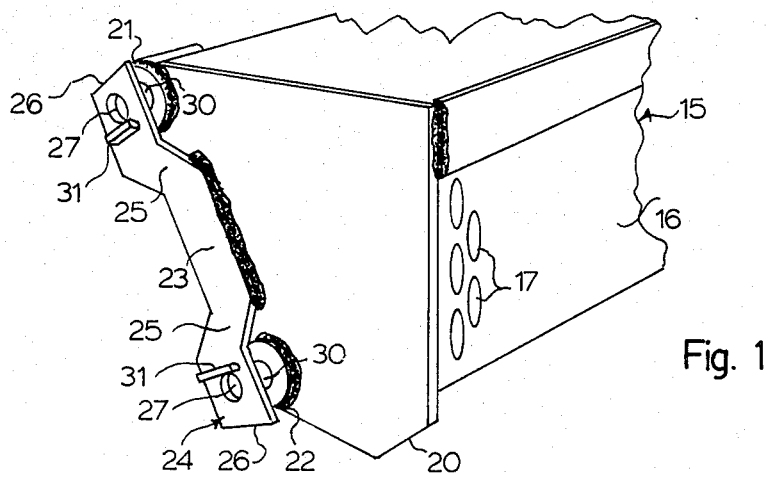
FIG. 1 is a perspective view broken to show one side of an elevator bucket with a plate in accordance with the invention welded thereto.
Figure 2:
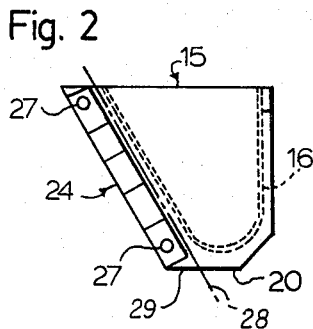
FIG. 2 is a side elevational view of the bucket shown in FIG. 1.
Figure 3:
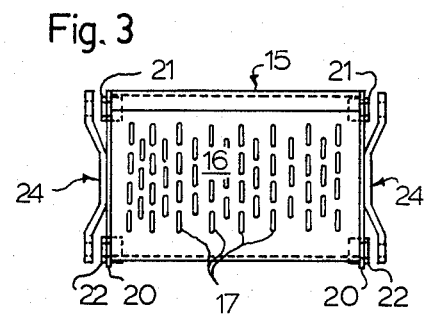
FIG. 3 is a front elevational view of the bucket shown in FIGS. 1 and 2.

Referring to FIGS. 1 through 5 an elevator bucket indicated generally by reference numeral 15 comprises a U-shaped screen plate 16 having a plurality of elongated apertures 17. Plate 16 is affixed between two bucket sides 20, each bucket side having affixed thereto a bushing 21 at its upper aspect and a further bushing 22 at its lower aspect. Bushings 21 and 22 are twelve inches apart from centerline to centerline of their respective bores 30. Bucket 15 is also twelve inches wide at the top between the forward and rear sides of plate 16 and, as seen in FIGS. 2 and 3, plate 16 is also twelve inches high from its interior bottom to the opening at the top.

A plate 24 is welded to the outer side of each side 20 which comprises two first projection parts 25 which extend from a central part 23 welded to side 20 outwardly to second parts 26 which are parallel to the adjacent side 20 and are spaced above bushings 21 and 22. An opening 27 in each side has the same diameter and is aligned with bore 30 in the corresponding bushing 21 or 22. An outwardly extending protrusion 31 inward of each opening 27, which is welded to or integrated with part 26, performs the function of preventing relative rotation of a roll pin 32 (only one being shown in FIGS. 4 and 5) because such pin's head 34 is provided with a flat area 35 which bears against protrusion 31. In this embodiment, pin 32 is threaded on its end 36 extending inwardly from bushing 22 where it receives a retaining nut 37 that, in turn, is retained by a cotter pin 39 extending through aperture through end 36. Other suitable means to retain pin 32 used in practice is spot welding. A lock washer may also be used or the threading may be dispensed with using, instead, a retainer pin in a hole through end 36. It is also known to use two protrusions 31 on each side of opening 27 with a T-head roll pin.

Figure 4:
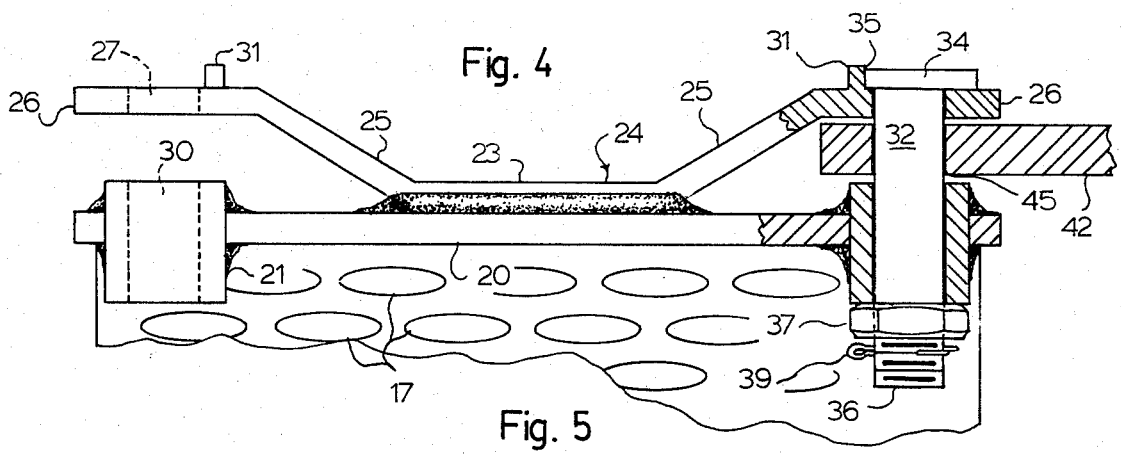
FIG. 4 is an enlarged detail back view in partial section, showing the plate welded to a side of the bucket and with with a straight link and roll pin included it its lower aspect.
Figure 5:
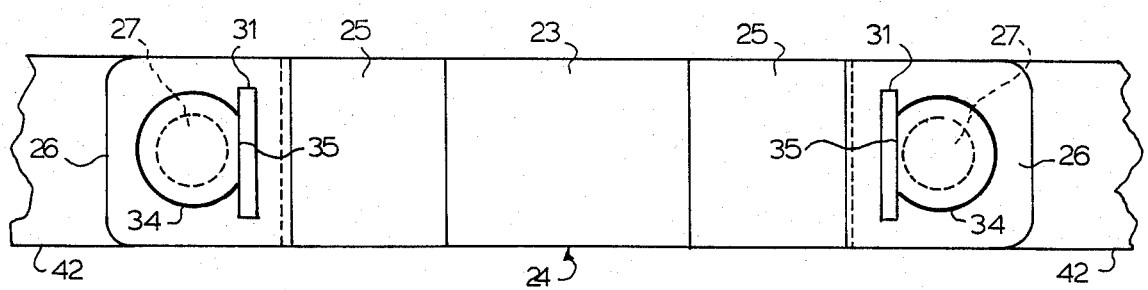
FIG. 5 is a side view of the plate shown in FIG. 4.

For the purposes of repairing or rebuilding a bucket 15, the rearwardly extending portion 29 of side 20 may be cut off at line 28 and replaced by a composite part which includes plate 24, bushings 21 and 22 welded in a strip or strap which corresponds to the removed portion 29 of side 20, such composite part then being welded to side 20 whereby it appears as shown in FIG. 4 except that reference numeral 20 refers to the strip or strap so welded to the rear of side 20 with portion 29 removed.

Figure 6:
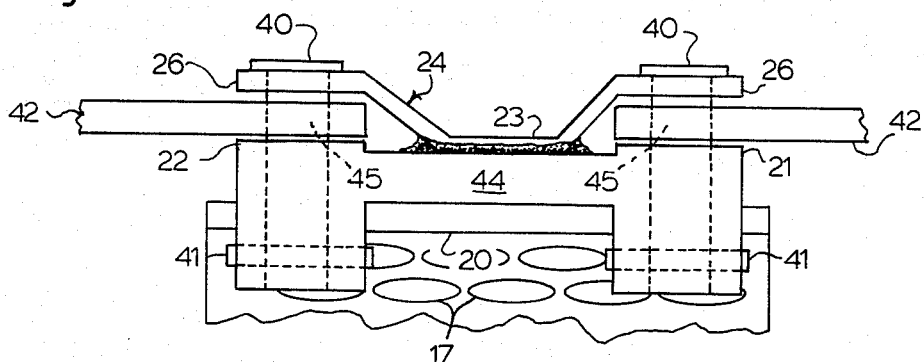
FIG. 6 is a side view similar to FIG. 4 including the roll pins and straight links.

Another embodiment is shown in FIG. 6 wherein roll pins 40 have round heads and are retained by a pin keepers 41 received in aligned openings through the inboard portions of bushing 21 and 22 and pins 40. It will be noted that each straight link 42, where it receives a pin 40, is permitted a certain amount of lateral play between the outer ends of bushings 21 and 22 and the inner surfaces of plate parts 26. In this embodiment, a strap 44 is welded between or otherwise integral with bushings 21 and 22 and central part 23 of plate 24 is welded to such strap. Strap 44 may also be welded or otherwise affixed to side 20 so that bushings 21 and 22 are received in half-moon notches (not seen) in the edge of side 20 and welded thereto. This provides a very strong connection between side 20, bushings 21 and 22, plate 24 and pins 40. However, it increases the weight and thickness of the assembly more than the arrangement shown in FIGS. 1–5. Strap 44 may also be placed on the other side of side 20. Links 42 have a thickness greater than that of straight links in conventional link chains for comparable bucket assemblies. This is about one inch (in practice 7/8th or 15/16th inches) as compared to about one-half of an inch at locations between openings for conventional straight links. If desired, the width can be manufactured to be thicker where link 42 has its opening 45 to a thickness of say 1¼ inches. Or link 42 may have a thickness of 1¼ inches throughout. Pins 40 are also 1½ inches in diameter with 1¾ inches diameter round heads. This compares with 1 to 1¼ inches diameter pins used with conventional link chains for the same purpose.

Figure 7:
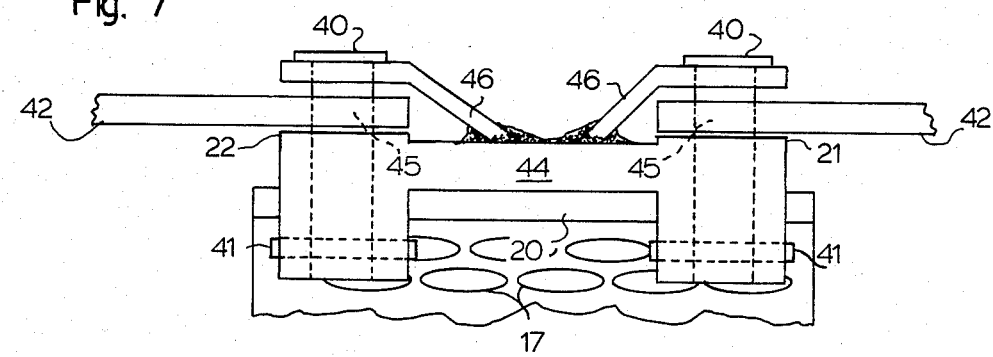
FIG. 7 is a view of a further embodiment similar to that of FIG. 6.

The embodiment shown in FIG. 7 is identical to that shown in FIG. 6 except the central portion 23 of plate 24 has been eliminated and the first and second parts thereof form two plates 46 which are welded directly to the strap 44. If desired, plates 46 can also be used in lieu of plate 24 in the embodiment shown in FIGS. 1 through 5. The advantage of having two plates 46 rather than a single plate 24 primarily exists in situations wherein the distance from the center of bore 30 in bushing 21 to the center of bore 30 in bushing 22 is different than it should be (twelve inches) such as where bushings 21 and 22 have been replaced on used buckets.

Figure 8:
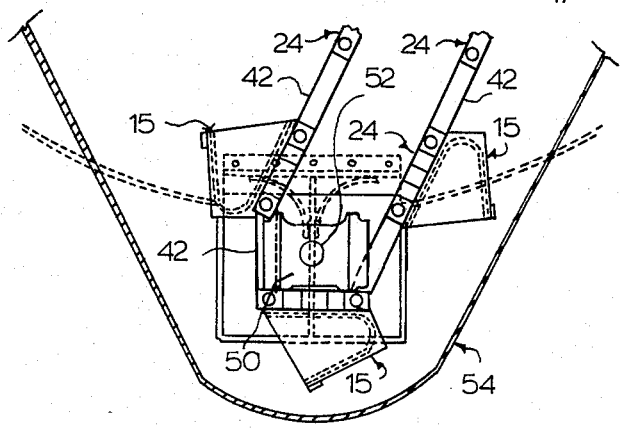
FIG. 8 is a sectional view taken transversely through an elevator compartment which illustrates the elevator mechanism located therein.
Figure 9:
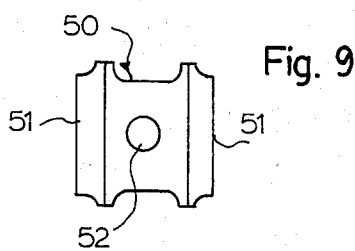
FIG. 9 is a side elevational view of the sprocket shown in FIG. 8.
Figure 10:
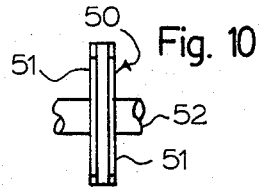
FIG. 10 is a front elevational view of the sprocket shown in FIG. 8 and 9.

FIGS. 8, 9 and 10 are included primarily to show the action of sprocket 50 which is generally square or rectangular and includes a pair of outwardly extending fork parts 51 which receive between then links 42. Sprockets 50 are supported by a shaft 52 which is journalled in bearings 53 to extend into the bottom portion of elevator compartment 54 in a manner known to the art. A similar sprocket 50 is located at the top of elevator compartment 54 where it is supported so it can be adjusted upwardly to make upfor wear and play which develops between links 42, pins 40, openings 27 and bushings 21 and 22 to manning the assembly in proper tension. As indicated previously, with the instant invention, less play and wear occurs than in conventional link chain assemblies for supporting buckets in coal washboxes.

Figure 11:
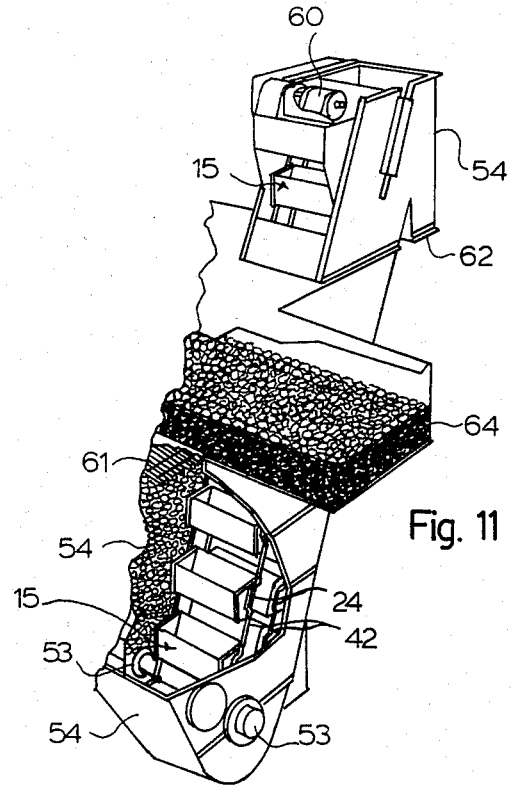
FIG. 11 is a partial view of a washbox showing in partial broken perspective the elevator compartment with the continuous elevator therein.

In FIG. 11 a representation of an endless conveyor is shown in which buckets 15 are connected in accordance with the instant invention. The assesmbly is driven by means of a motor 60 which through appropriate gearing or belting drives upper sprocket 50.

In operation, middlings materials are discharged from evacuation gate 61 into compartment 54 together with hutch water. Motor 60 causes buckets 15 to be rotated so as to carry the middlings up to the top of compartment 54 and finally discharge same centrifugally and by gravity through a discharge chute 62. Thereafter, the discharged middlings may undergo further treatment to provide additional marketable tonnage for certain types of coal. Clean coal 64 proceeds to dewatering equipment not shown. Silica and hutch material drains from apertures 17 in buckets 15 to drainage boots located under the bottom of elevator compartment 54, also not shown.

Links 42, as indicated above, are 1 to 1¼ inches thick. They are made from 450 BRN manganese steel alloy. Plates 24 are one-half inch thick material welded to sides 20 and are also 450 BRN manganese steel. Pins 40 are 1¼ to 1½ inches in diameter and, if installed on existing systems, are one-fourth inch greater in diameter than the prior pins. They are preferably 4140 material which has been heat treated to 38–42R.C. Links 42 may be composed of manganese chromium steel (11–14 percent manganese and 2 percent chromium) known also as ASTM A128 grade "C" alloy austenitic manganese steel having, as indicated above, Brinell Hardness of at least 450. Links 42 may also be "Astralloy-V" wear plates produced by Astralloy-Vulcan/Manganese Steel Forge, a Division of Plant City Steel Co.—Harsco Corporation which cites U.S. Pat. No. 3,379,582 in its advertising.

The angle between plate part 25 and side 20 should normally be between thirty degrees and fifty degrees and preferably between thirty-five and forty degrees. The preferred angle is about 37½ degrees.

Although I have described the preferred embodiments of my invention, it is to be understood to be capable of other adaptations and modifications within the scope of the appended claims.

Having thus disclosed my invention what I claim as new and to be by letters patent of the United States is:

1. An elevator mechanism for removing refuse material having abrasive characteristics, the mechanism comprising:
   a plurality of buckets having parallel vertical sides;
   roll pins and bushings for receiving said roll pins extending normally from near the top and bottom of each bucket side;
   links having openings receiving said roll pins connecting said buckets so that each link connects the top roll pin of one bucket to the lower roll pin of the adjacent bucket to form an endless bucket elevator, each roll pin including a retaining head which is disposed outwardly and spaced from its corresponding links;
   a plate rigidly affixed adjacent each said roll pin to the outside of each said bucket side, said plate having a first part extending outwardly of said bucket side to which it is affixed and a second part spaced outwardly of said bucket side to form a fork arrangement which defines a space between said second part and said bucket side which includes a said bushing as opposing sides of the fork, said plate further having an opening aligned with the bore of said bushing in said fork arrangement receiving said roll pin, said link receiving said roll pin in said fork arrangement between said second part and the corresponding said bushing.

2. An elevator mechanism in accordance with claim 1 wherein the outboard side of each said bushing is approximately flush with the exterior surface of its corresponding bucket side and the inboard side thereof extends inboard of such bucket side's interior surface.

3. An elevator mechanism in accordance with claim 1 wherein said plate's first part is welded to said bucket side and extends approximately normally therefrom.

4. An elevator mechanism in accordance with claim 1 wherein said plate's first part is welded to said bucket side and extends at a bias therefrom.

5. An elevator mechanism in accordance with claim 1 wherein each said plate has a central part which rigidly joins said first parts on the same bucket side and is welded to said bucket side.

6. An elevator mechanism in accordance with claim 5 wherein said first, second and central parts on each bucket side are integral single piece steel plates.

7. An elevator mechanism in accordance with claim 6 wherein said first parts are biased outward relative to their corresponding bucket side.

8. An elevator mechanism in accordance with claim 7 wherein said bias is between thirty degrees and fifty degrees relative to said corresonding bucket side.

9. An elevator mechanism in accordance with claim 8 wherein said bias is between thirty-five degrees and forty degrees relative to said corresponding bucket side.

10. An elevator mechanism in accordance with claim 9 wherein said bias is about 37½ degrees relative to said corresponding bucket side.

11. An elevator mechanism in accordance with claim 1 wherein said inboard side of each said bushing extends inwardly of the interior of its corresponding bucket side and a keeper for said roll pin extends parallel to said bucket side through aligned apertures in the inboard side of said bushing and said roll pin received therein.

12. A continuous bucket elecator which comprises:
   a plurality of buckets having substantially vertical and parallel sides;
   a pair of bushings affixed to each said side so that one bushing is disposed at its upper rear aspect and one bushing is disposed at its lower rear aspect, the outward ends of said bushings being in substantially the same plane;
   a pair of plates affixed to each said side adjacent to each said bushing, each said plate having a first part extending outwardly from said side and a second part extending substantially parallel to each side to form on each said side a bifurcated arrangement, each said second part having an opening therein which is aligned with a bore of an adjacent said bushing in said first part;

each said bucket connected to the adjacent bucket by a pair of links, each said link having a hole at each end, said latter end of each said link being received in a respective said bifurcated arrangement between a said second part and the bushing adjacent thereto whereby said hole is aligned with the opening in said second part and the bore in the corresponding said bushing and a pin is received in said aligned opening, hole and bore, a said link being provided between each said second part and its corresponding said bushing so that each said bucket is connected to the bucket adjacent thereto by a respective said link extending between said bifurcated arrangements in the lower rear aspects and the upper rear aspects of said sides of said adjacent buckets.

13. A continuous bucket elevator in accordance with claim 12 wherein said sides are joined by a plate which is U-shaped in cross section.

14. A continuous bucket elevator in accordance with claim 13 wherein said sides have a plurality of relatively small openings therein.

15. A continuous bucket elevator in accordance with claim 14 which is contained in an elevator compartment of apparatus for washing and separating refuse material from coal, and is used for removing refuse material delivered to said compartment.

16. A bucket in a continuous elevator for use in a method of separating mineral particles of a lower settling rate from mineral particles of a higher settling rate by introducing a bed of said particles into water and repeatedly subjecting said bed to cycles of vertically acting alternate pulsion and suction strokes of water to effect stratification of said particles, removing one strata from said bed and conveying same to a compartment for said elevator so that each bucket in said elevator receives water and material from said one strata, raising said material to drain said water and discharge said material separately from other strata in said bed, said bucket comprising two sides joined by a container part having openings for the discharge of said water, bushings disposed in the upper and lower aspects of each said side, plate means rigidly secured to each said side between said bushings, said plate means including a pair of flanges, each said flange extending outwardly of and spaced from a respective said side over one of said bushings and including pin receiving means coaxial with said one bushing which pin receiving means receives a pin which is also received by the adjacent said one bushing, a link receiving said pin between said one bushing and said pin receiving means, said link extending between a further flange and further pin receiving means in an adjacent bucket whereby it receives a further pin and connects said adjacent buckets.

17. A bucket for use in a method of separating mineral particles in accordance with claim 16 wherein said pin receiving means comprises an opening in said flange which is aligned with the bore in said bushing, said pin being received through said bores and a hole in said link.

18. A bucket in a continuous elevator for use in a method of separating mineral particles in accordance with claim 17 wherein said flanges move closely adjacent the vertical sides of said compartment.

19. A bucket in a continuous elevator for use in a method of separating mineral particles in accordance with claim 18 wherein said elevator turns about rectangular sprockets which grasp said links between the corresponding said bushings.

* * * * *